United States Patent
Chuprun et al.

(12) 
(10) Patent No.: US 6,301,239 B1
(45) Date of Patent: Oct. 9, 2001

(54) DISTRIBUTED PACKET COMMUNICATION NETWORK

(75) Inventors: Jeffery Scott Chuprun, Scottsdale; Margaret Reed Ennis, Fountain Hills; David Michael Harrison, Mesa, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/991,822

(22) Filed: Dec. 17, 1997

(51) Int. Cl.⁷ .............................. H04B 7/216; H04L 12/28
(52) U.S. Cl. ........................ 370/342; 370/441; 370/449; 455/3.01; 375/148
(58) Field of Search .......................... 370/330, 335–337, 370/347, 343, 468, 252, 437, 329, 341–342, 344, 346, 348, 445–448, 441, 449; 445/3.01; 375/148

(56) References Cited

U.S. PATENT DOCUMENTS 5,537,414 * 7/1996 Takiyasu et al. .................... 370/347
5,729,541 * 3/1998 Hamalainen et al. ............... 370/337
6,031,827 * 2/2000 Rikkinen et al. .................... 370/347

\* cited by examiner

*Primary Examiner*—Wellington Chin
*Assistant Examiner*—Maikhanh Tran
(74) *Attorney, Agent, or Firm*—Bradley J. Botsch; Maurice J. Jones; Sharon K. Coleman

(57) ABSTRACT

A multiple access and data channel scheme is presented for reducing network communication collisions and susceptibility to jamming signals in a distributed network to increase network connectivity and communication throughput. An order wire channel (202) is used to gain access to a data channel (204). To gain access to the data channel (204), a source radio sends a transmit probe (TXP) over the order wire channel (202) to the target radio. The target radio senses its environment and responds with a receive probe (RXP) which comprises data channel transmission parameters including the data channel frequency, transmit power, spread code, and transit timing to be used for the data transmission. Source radio moves to the data channel using the data channel transmission parameters specified by the receive probe (RXP) to communicate with the target radio. If a collision occurs of the order wire channel (202), the source radio retransmits the transmit probe after a random time period.

18 Claims, 3 Drawing Sheets

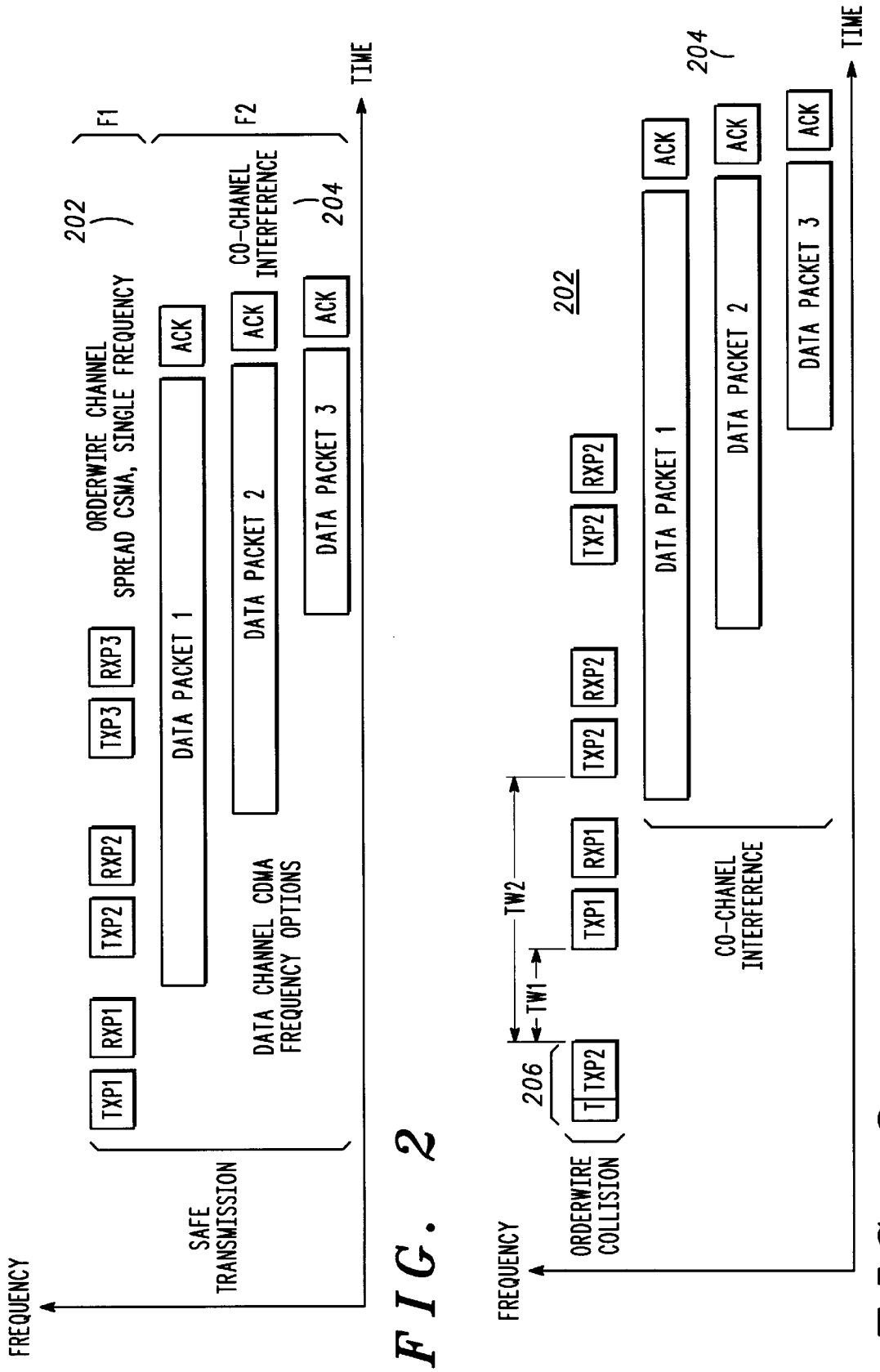

DISTRIBUTED PACKET COMMUNICATION NETWORK

STATEMENT OF GOVERNMENT INTEREST

This invention was made with government support under contract F30602-94-C0185 awarded by the U.S. Air Force. The government has certain rights in this invention.

FIELD OF THE INVENTION

The present invention pertains generally to communications systems, and more particularly, to a distributed wireless network.

BACKGROUND OF THE INVENTION

The trend in the telecommunications industry is towards multiple node, mobile, fully distributed networks in which all the information and intelligence resides in the nodes of the networks. In developing such a communications system, it is desirable to provide networking capabilities which enhance the connectivity and data throughput in mobile environments with interference. In the past, such networks have only been optimized for high message throughput without concern for preventing signal jamming by friendly or hostile interference.

In designing a wireless communications system, one is faced with issues of mobility management, survivability requirements, and bandwidth limitations. To manage a network in which most or all of the network nodes are mobile, the communication system must have the ability to provide frequent network status transmissions and to provide a method for maintaining contact with each node during node movement. It is desirable to reduce the impact of interference from jamming signals, and to reduce signal collision after channel access orderwire has been acquired and communication sessions have been acknowledged. It is further desirable to provide high communications connectivity and throughput while making efficient use of available bandwidth.

BRIEF DESCRIPTION OF THE DRAWINGS

The invention will be better understood from a reading of the following detailed description taken in conjunction with the drawings in which like reference designators are used to designate like elements, and in which:

FIG. 2 is a block diagram of an order wire request and acknowledge channel and a data channel in accordance with the invention;

FIG. 3 is a block diagram of the order wire channel and a multi-user data channel of FIG. 2 which illustrates a collision over the order wire channel;

DETAILED DESCRIPTION

The present invention utilizes a multiple access and datachannel arrangement in a distributed network to reduce network communication collisions and susceptibility to jamming signals, while increasing network connectivity and communication throughput. A multiple access arrangement which controls access to a data channel by multiple users desiring to communicate over the data channel is combined with a data channel arrangement which determines format and communication protocol over the data channel.

Figure 1:
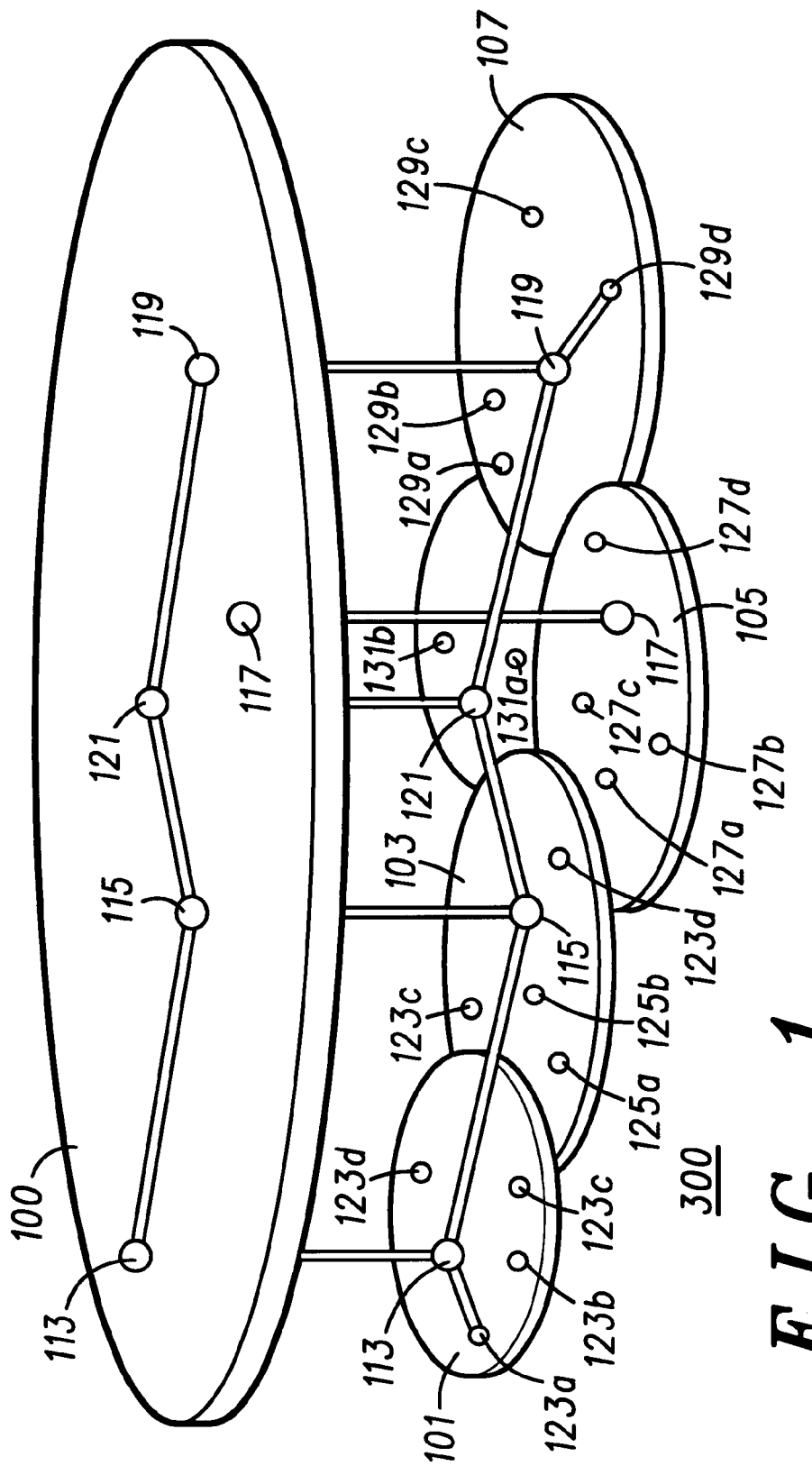
FIG. 1 is a diagram of a wide area network including multiple subnets that are coupled through a wireless backbone in accordance with the principles of the invention.

FIG. 1 is a diagram of a wide area network 100 in accordance with the principles of the invention. A plurality of local area networks 101, 103, 105, 107, 109 are coupled together through a backbone of gateways 113, 115, 117, 119, 121 to form the wide area network 100. Local area subnets 101, 103, 105, 107, 109 are preferably local area networks. Subnet 101 includes members 123a, 123b, 123c, 123d. Subnet 103 includes members 125a, 125b, 125c, 127. Subnet 105 includes members 127a, 127b, 127c, 127d. Subnet 107 includes members 129a, 129b, 129c, 129d. Subnet 109 includes members 131a, 311b. Each local area subnet 101, 103, 105, 107, 109, includes a gateway channel represented as nodes 113, 115, 117, 119, 121, which together comprise the backbone of wide area network 100.

In operation, all communications within each individual subnet 101, 103, 105, 107, 109 preferably occur point to point. Communications with subnet members located outside the local area subnet, however, are routed through the local subnet gateway. For example, in FIG. 1, if subnet member 123a of local area subnet 101 is to communicate with subnet member 129d of local area subnet 107, subnet member 123a must communicate through its local subnet gateway 113. Gateway 113 routes the communication through the backbone until it reaches the gateway 119 of the local area subnet 107 of its intended destination subnet member 129d. Accordingly, in this example, gateway 113 routes the communication to gateway 115, which routes it to gateway 121, which routes it to gateway 119. Gateway 119 of local area subnet 107 routes the communication to its subnet member 125. Accordingly, communications outside the local area subnets 101 through 109 are routed through the backbone 113 through 121 of wide area network 100.

To provide efficient communication throughout a local area subnet 101, 103, 105, 107, 109, each local area subnet is preferably designed to support efficient point-to-point communication between each of its subnet members. In local area subnets in which subnet members are mobile, it is possible that at any given time not all subnet members are able to communicate with one another point-to-point. This may occur, for example, if two or more subnet members are out of direct communication range with one another. In this instance, subnet members which want to communicate with other subnet members within the same local area subnet but which are out of direct point-to-point communication range communicate through the subnet gateway which preferably is in communication range with all subnet members in the local area subnet. The architecture of a local area subnet becomes even more complex when the gateway is mobile as well. In such a case, each subnet member in the local area subnet is preferably configured to be able to operate as the subnet gateway if need be. The gateway functionality is preferably passed from subnet member to subnet member overtime according to whichever subnet member is in the prime geographic location to be able to best communicate with each other subnet member in the local area subnet. Thus, the subnet gateway in a given local area subnet is preferably the subnet member which is able to communication with the greatest number of users in the local area subnet. The designated gateway is determined by having each subnet member poll each other subnet member to determine how many other subnet members it can communicate with, and then the subnet member which can communicate with the most subnet members operates as the subnet gateway until another subnet member is able to communicate with the most subnet members. Alternatively, the designated gateway is determined by having each subnet member sense its environment via the order wire channel, discussed hereinafter. In this configuration, each subnet member is provided with the ability to sense which subnet members it can communicate with Thus, the subnet member which can sense the most other subnet members is designated as the subnet gateway.

As an illustrative example of the above principles, FIG. 1 shows that at the particular moment in time illustrated, subnet member 113 is designated as the subnet gateway of subnet 101. Suppose that in FIG. 1 subnet member 123*a* is not in direct communication range with subnet member 123*c* located within the same local area subnet 101. If subnet member 123*a* wants to communicate with subnet member 123*c*, it senses for subnet member 123*c* over an order wire channel, discussed hereinafter, but cannot sense it. Subnet member 123*a* automatically knows that subnet member 123*c* is not in direct communication range, and accordingly sends the communication message through gateway 113 which routes it to subnet member 123*c*. Because gateway 113 is preferably in communication range with each subnet member 123*a*, 123*b*, 123*c*, 123*d* in the local area subnet 101, it has the ability to route the communication message to subnet member 123*a* Accordingly, as long as the subnet gateway is in direct communication range with each subnet member in its local area subnet, no sophisticated routing map or algorithm is required since the gateway operates as the only intermediate routing node. If the subnet gateway is not in direct communication range with each subnet member, a more sophisticated routing algorithm is required to be able to route communications to their intended destinations.

According to the invention, each subnet gateway (and preferably each subnet member) is implemented using smart radio technology. In other words, each subnet gateway is aware of its spectral environment, what communications are going on, and what interference is present and if contentions are occurring. A smart radio is able to determine its environment and to determine what frequencies and what power level it needs to receive to be able to receive the communication clearly without adding excessive noise to the orderwire and data channels.

FIG. 2 illustrates order wire channel 202 timing for a direct sequence (DS) spread spectrum, singe frequency channel and a DS/CDMA (code division multiple access) data channel 204 in accordance with the invention, and illustrates the wireless multiple access and data channel scheme for the distributed network system of FIG. 1 in which no central control node exists and each gateway is implemented using smart radio techniques. Order wire channel 202 is a single channel occupying frequency range F1. Datachannel 204 is a singe channel occupying frequency range F2 over which multiple smart radios (implemented in gateways 113 through 121) communicate. If a source radio must communicate with a target radio over data channel 204 (as, for example, via routings through the backbone of wide area network 100 in FIG. 1), a communication link is first established over order wire channel 202. A source radio (e.g gateway 113 in FIG. 1) sets up a comunnication link by sending a transmit probe TXP1 over order wire channel 202. Target radio (e.g, gateway 119 in FIG. 1) responds by sending a receive probe RXP1. Receive probe RXP1 preferably contains data channel transmission parameters including the data channel frequency, transmit power, spread code, and transmit timing to be used for the data transmission. When the order wire process is completed, the radios move to the separate data channel 204, where communications take place using the data channel transmission parameters as specified in the receive probe RXP1. The data channel 204 is where all message traffic occurs for the network radios. A single data channel 204 is simultaneously occupied by transmissions that are assigned from the order wire process just discussed. Preferably, datachannel 204 is multiplexed using the well-kown Code Division Multiple Access (CDMA) multiplexing scheme. Using CDMA, each communication link employs a different spreading code to provide CDMA performance. The transmission times are not synchronized and power control is coarse, yet the large processing gains provide capacity improvements over singe user per channel methods. Preferably, source radio transmits each data packet and receives an acknowledge ACK for each data packet from target radio. Thus, as illustrated in FIG. 2, source radio sends Data Packet 1 to target radio, and target radio sends an acknowledge message ACK to source radio which indicates that the target radio received Data Packet 1. Preferably, data packets are transmitted over data channel 204 using a code division multiple access (CDMA) transmission protocol. Under CDMA, data is spread with codes. Order wire 202 has one distinct code which all radios which have access to the data channel know. Each radio is also assigned a unique code. Thus, a source radio communicates with a target radio by transmitting the target radio's unique code over data channel 204. FIG. 2 illustrates communication between two other pairs of radios in the network, as shown by the communication links set up indicated by transmit probes TxP2 and TxP3 and corresponding respective receive probes RxP2 and RxP3. Since data channel 204 is preferably implemented using a CDMA protocol, a singe data channel can support multiple communications between different multiple users. Precise timing obtained from the orderwire synchronization process and knowledge to path delays enhances the ability to recognize the proper transmission when CDMA traffic is present. It will be appreciated by those skilled in the art that a singe order wire channel may be associated with multiple data channels.

FIG. 3 is a block diagram of the order wire channel 202 and data channel 204 illustrating a collision over order wire channel 202. A collision occurs when more than one transmission occurs simultaneously, or overlap in time, over the order wire channel. FIG. 3 illustrates a collision 206 where two radios attempt to access the order wire channel 202 nearly simultaneously. Collision 206 may occur, for example, when two different radios cannot sense each other, as for example if the two different radio are not in direct communication range. When a collision occurs, neither source radio receives a receive probe from the intended target radio, which indicates to both source radios that the target radio is either busy, unable to communicate, or that a collision occurred. Accordingly, both source radios perform a retransmission, preferably after a random wait period. In FIG. 3, TXP1 is retransmitted after a first random wait time TW1 and successfully receives receive probe RXP1. TXP2 is retransmitted after a second random waiting time TW2 and successfully receives receive probe RxP2 in response. Thus random wait time TW1 is less than random wait time TW2. On a different collision, TW2 may be less than TW1. The use of random wait times before retransmitting preferably ensures that collisions are not repeated due to identical retransmission wait times.

In addition, each radio preferably has the ability to sense activity on the order wire channel 202 and to wait before attempting communication over the order wire channel if it senses activity. This may be implemented according to the well-known Carrier Sense Multiple Access protocol with Collision Detect (CSMA/CD). This feature operates to additionally reduce the number of collisions on the order wire channel 202.

Figure 4:
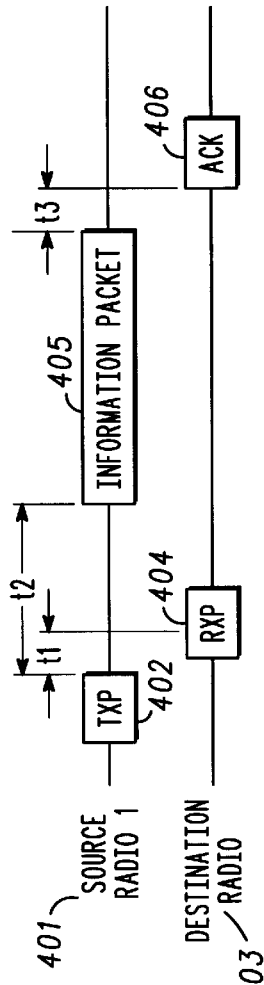
FIG. 4 is a timing diagram for the multiple access scheme and data channel with acknowledgement.

FIG. 4 is a timing diagram illustrating a multiple access scheme in accordance with the invention. To avoid the synchronization and timing problems associated with a distributed network system, the multiple access scheme of the invention employs an asynchronous timing sequence through the use of transmit and receive probes as illustrated in FIG. 4. Thus, as shown in FIG. 4, source radio 401 transmits it's transmit probe TXP 402 over order wire channel 202 of FIG. 2. Within a fixed period of time T1, destination radio 403 sends out its receive probe RXP 404. Accordingly, the fixed response time T1 allows the source radio 401 to know that it will receive the receive probe RXP 404 within a fixed period of time after it transmits transmit probe TXP 402. Once source radio 401 receives receive probe RXP 404, then information packet 405, which contains the message content, is transmitted a fixed time period T2 after the transmission of transmit probe TXP 402. Accordingly, destination radio 403 knows when to expect to receive information packet 405. Then a fixed time period T3 after the end of the information packet 404 has been received, an acknowledgment ACK 406 is sent by destination radio 403 to source radio 401. According to the multiple access scheme shown in FIG. 4, if source radio 401 does not receive a receive probe RXP within time T1, it determines that destination radio 403 is busy, unable to communicate, or that a collision has occurred. Source radio 401 then retransmits a transmit probe TXP, preferably a random time period later, in order to reattempt to set up a communication link with destination radio 403. In addition, destination radio 403 knows to expect an information packet 405 within a time period T2, which provides synchronization in an asynchronous protocol. Finally, if source radio 401 does not receive an acknowledge ACK within time period T3 after sending information packet 405, it knows to retransmit information packet 405.

Figure 5:
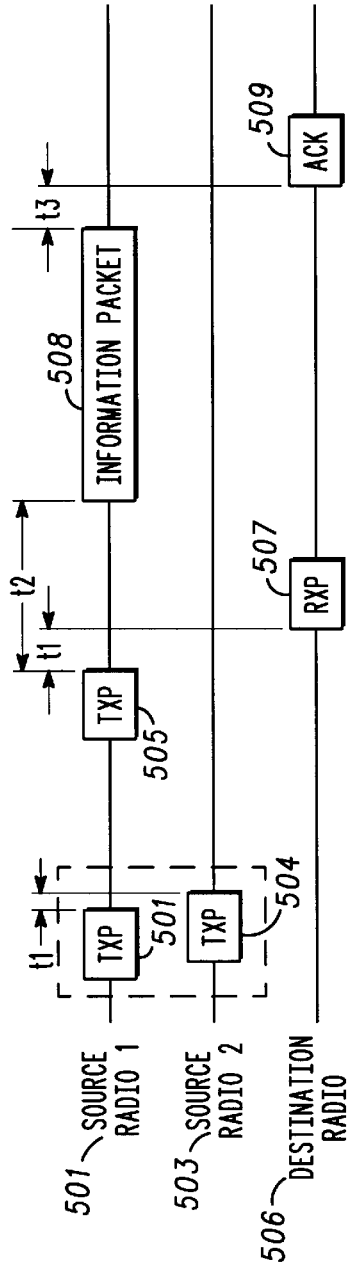
FIG. 5 is a timing diagram for the multiple access scheme illustrating a collision and resolution process on the order wire channel and data channel.

FIG. 5 is a timing diagram for the multiple access scheme illustrating a collision on the order wire channel 202. FIG. 5 illustrates two different source radios 501 and 503 each sending out their respective transmit p robes 502 and 504 during which there is an overlapping period of time where both source radios 501 and 503 are waiting for the return receipt of a receive probe from respective destination radios. A collision occurs and neither source radio 501 or 503 receives a receive probe within fixed time period T1. Each source radio 501 and 503 retransmits its respective transmit probe after a respective random time period. In FIG. 5, source radio 501 has a smaller random time period than source radio 503. Source radio 501 sends out its transmit probe 505 and receives a receive probe 507 from destination radio 506 within fixed time period T1. Source radio 501 then sends out information packet 508 after fixed time period T2, and receives an acknowledge ACK 509 from destination radio 506 within fixed time period T3.

It will be appreciated by those skilled in the art that the invention described herein allows frequent network status transmissions to be communicated and provides a method for maintaining contact with radios during movement. The network protocol allows status messages that include routing table dissemination, environmental conditions, and time-of-day (TOD) synchronization data to be sent efficiently.

In addition, the invention provides a method for increasing communications connectivity and throughput for radios using spread spectrum signals with variable processing gai This method is compatible with signals that achieve processing gains in the range of 10 dB to 40 dB or higher as practical implementation will allow. According to an embodiment of the invention, the source radio verifies that the destination radio is able to communicate before it sends messages over the data channel, thus ensuring connectivity before transmitting lengthy messages. This frees the data channel of messages that will not be received, thereby providing more efficient use of the available channel bandwidth.

The spread spectrum signals are key to the network survivability concept by providing the means for reducing the imp act of interference on the order wire channel from jamming signals and to reject collisions that occur after acquisition, and to take advantage of CDMA techniques on the data channel. The use of CDMA and Walsh codes as the bandwidth spreading signals allows the creation of orthogonal channels for distributing routing, control and status information during normal message traffic.

The multiple access scheme of the invention provides a synchronous channel access using transmit and receive probes, while also providing instant synchronization for use by network nodes via the rigid timing assignments for the transmit/receive probes and data transmissions. The anti-jam distributed network concept described herein provides an order wire channel to improve radio access times and broadcast channel activity to network members. Signals can be synchronized without pilot channels, and can synchronize to the transmit and receive probes using time-of-day (TOD) reference and search techniques. The TOD used for code synchronization can be updated at regular intervals through the order wire channel. The ability to send status and control messages on the data channel allow routing algorithms to be used that increase the connectivity and throughput for the network members.

The invention has been described in terms of an illustrative embodiment. It will be understood by those skilled in the art that various changes and modifications may be made to the illustrative embodiment without departing from the spirit or scope of the invention. It is intended that the invention be limited only by the claims appended hereto.

What is claimed is:

1. A method for preventing interference of inter-node code division multiple access spread spectrum communication directly between individual members each having transmitter means and receiver means, the members being in a distributed network, comprising:

at least one of the transmitter means sending a transmit probe over an order wire channel directly to at least one of the receiver means;

said one of the transmitter means determining if a receive probe comprising transmission parameters of a data channel is received from the transmitter means corresponding to said at least one of the receiver means;

said one of the transmitter means sending an information packet over said data channel directly to said at least one of the receiver means accordng to said data channel transmission parameters if said determining step determines said receive probe is received; and if said receive probe is not received, said at least one of the tranmitter means waiting a delay period and transmitting said transmit probe over said wire channel directly to said at least one of the receiver means.

2. A method in accordance with claim 1 further including the step of receiving an acknowledge message which indicates that said information packet has been received by its destination.

3. A method in accordance with claim 2, comprising:

retransmitting said information packet over said data channel, if said acknowledge message is not received.

4. A method in accordance with claim 1, comprising:

receiving said receive probe within a first fixed time period.

5. A method in accordance with claim 4, comprising:

receiving said information packet within a second fixed time period.

6. A method in accordance with claim 5, comprising:

receiving an acknowledge message within a third fixed time period.

7. A method in accordance with claim 4, comprising:

waiting a fourth time period before retransmitting said transmit probe over said order wire channel, if said receive probe is not received within said first fixed time period.

8. A method in accordance with claim 7, comprising:

determining said fourth time period randomly.

9. A method for preventing interference with inter-node communication in a code division multiple access spread spectrum distributed network directly between individual members in the distributed network each having transmitter means and receiver means, comprising:

one of the transmitter means sending a transmit probe over an order wire channel directly to one of the receiver means;

a receiver in the member having said one of the transmitter means receiving a receive probe directly from the transmitter of the member having said one of the receiver means, said receive probe comprising data channel transmission parameters for use in communicating over a data channel within a first fixed time period;

said one of the receiver means receiving an information packet over said data channel; and said transmit probe being retransmitted over said order wire channel if said receive probe is not received within said first fixed time period.

10. A method in accordance with claim 9, comprising:

said receiver in the member having said one of the transmitter means receiving an acknowledge message within a second fixed time period.

11. A method in accordance with claim 10, comprising:

retransmitting said information packet over said data channel if said acknowledge message is not received within said second fixed time period.

12. The method of claim 1 wherein said transmission parameters include the transmit power, the spread spectrum code and transmit timing signals to be used for the transmission of the data packet to said at least one of said receiver means.

13. The method of claim 9 where said data channel transmission parameters include the transmit power, the spread spectrum code and the transmit timing to be used for transmitting the information packet.

14. A method for providing code division multiple access spread spectrum inter-node communication directly between smart radios of a distributed network, each of the smart radios including a transmitter means and a receiver means, each of the smart radios being capable of operating as a network gateway, comprising:

each of the radios polling the other radios to determine how many of the other radios that they can communicate with;

selecting the radio which can communicate with the most other radios to operate as the network gateway radio;

continuing to poll said network radios to determine which radio is able to communicate with the most other radios; and reselecting another radio to operate as a network gateway when it is determined that said another radio is able to communicate with more radios than the previously selected gateway radio.

15. A method of claim 14 further having the radios share an order wire channel, comprising:

providing each radio with the ability to sense its environment via the order wire channel; and designating the radio which can sense the most other radios over the order wire channel as the designated network gateway radio.

16. The method of claim 15 being adapted to prevent interference with the inter-node communication between the radios, comprising:

one of the transmitter means operating as a source transmitter means and sending a transmit probe over said order wire channel directly to a target receiver means with which it is desired to establish a communication link;

said source transmitter means determining if a receive probe comprising the transmission parameters of a data channel is received, said source transmitter means thereby verifying it is able to communicate with said target receiver means before it sends messages over the data channel thus ensuring connectivity with said target receiver means; and said source transmitter means sending an information packet over said data channel directly to such target means receiver according to said data channel transmission parameters if said determining step determines said receive probe is received; and if said receive probe is not received said source transmitter means waiting a delay period and again transmitting said transmit probe over said order wire channel to said target receiver means.

17. The method of claim 16 wherein said data channel transmission parameters include the data channel frequency, transmit power, spread code and transmit timing to be used for the data transmission.

18. A method of claim 14 wherein Walsh codes are used as bandwidth spreading signals to allow the creation of orthogonal channels for distributing routing control and status information during normal message traffic to facilitate the inter-node communication between the radios.

* * * * *

UNITED STATES PATENT AND TRADEMARK OFFICE
CERTIFICATE OF CORRECTION

PATENT NO. : 6,301,239 B1 Page 1 of 1
DATED : October 9, 2001
INVENTOR(S) : Jeffery Scott Chuprun, Margaret Reed Ennis and David Michael Harrison It is certified that error appears in the above-identified patent and that said Letters Patent is hereby corrected as shown below:

Column 1,
Line 24, delete "signaljamming" and insert -- signal jamming --
Line 64, delete "datachannel" and insert -- data channel --

Column 2,
Line 58, delete "overtime" and insert -- over time --

Column 3,
Line 8, insert -- . -- after "with"
Line 54, delete "datachannel" and insert -- data channel --
Line 61, delete "(e.g gateway" and insert -- (e.g. gateway) --

Column 4,
Line 9, delete "datachannel" and insert -- data channel --
Line 15, delete "singe" and insert -- single --
Line 34, delete "singe" and insert -- single --
Line 40, delete "singe" and insert -- single --

Column 5,
Line 24, insert -- , -- after "Then"
Line 44, delete "p robes" and insert -- probes --

Column 6,
Line 14, delete "imp act" and insert -- impact --
Lines 20-21, delete "a synchronous" and insert -- asynchronous --
Lines 61-62, delete "transmitting" and insert -- retransmitting --
Line 62, insert -- order -- between "said" and "wire"
Line 65, insert -- said one of the transmitter means -- before "receiving"

Signed and Sealed this

Sixth Day of August, 2002

*Attest:*

*Attesting Officer*

JAMES E. ROGAN
*Director of the United States Patent and Trademark Office*